Jan. 19, 1943.  W. D. MARR  2,308,702
FRAME FOR FISHING REELS
Original Filed Jan. 30, 1939

INVENTOR.
Walter D. Marr
BY Parker and Burton
Attorneys

Patented Jan. 19, 1943

2,308,702

UNITED STATES PATENT OFFICE 2,308,702

FRAME FOR FISHING REELS

Walter D. Marr, Flint, Mich.

Original application January 30, 1939, Serial No. 253,568. Divided and this application July 21, 1941, Serial No. 403,262

4 Claims. (Cl. 43—20)

This invention relates to improvements in fishing reels and forms divisional subject matter of my copending application for United States Patent Serial No. 253,568, filed Jan. 30, 1939, which has eventuated in Patent No. 2,252,777.

An important object of this invention is to provide an improved fishing reel structure which is economical to construct and assemble and which requires only very slight changes in the parts of the reel structure to adapt the winding drum and associated operating parts to any size of fishing reel. More particularly it is the purpose of this invention to provide an improved fishing reel assembly formed of parts which are rapidly and easily assembled and which for the most part are interchangeable for various sizes of deep sea fishing gears. The frame for the reel is so constructed that it can be expanded or contracted in size to accomodate winding drums and certain associated mechanisms of various sizes. This is accomplished by the provision of novel coupling means utilized between the end of the frame arms and the rod receiving means. As a result, the same frame arms may be used regardless of the size of the reel thus economizing in the number of parts and expediting the manufacturing operation.

Figure 1:
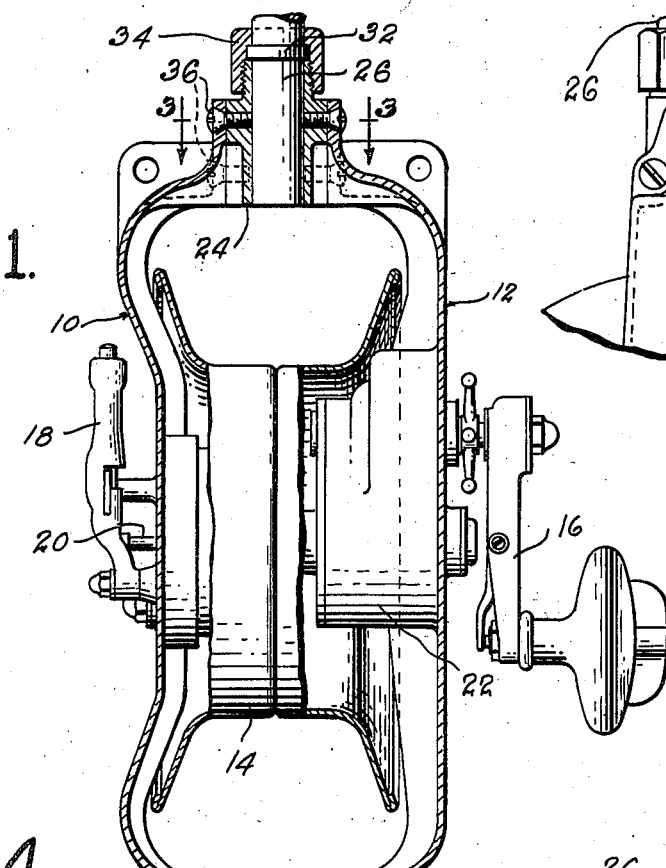
Figure 2:
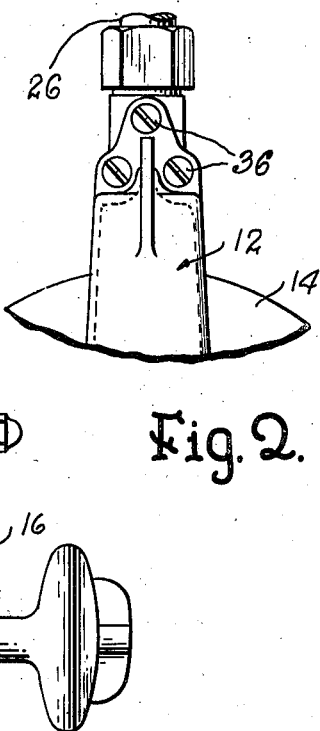
Figure 4:
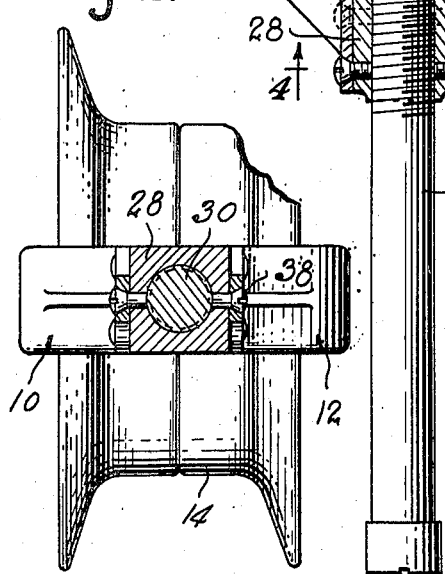
Figure 3:
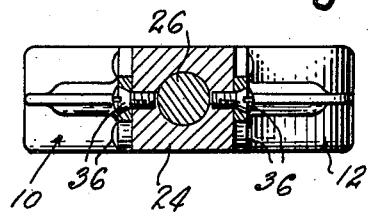
Figure 5:
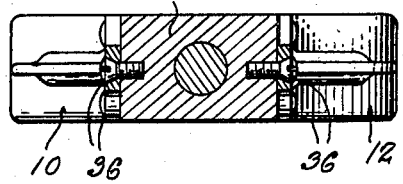

Various other objects, advantages and meritorious features will become more fully apparent from the following specification, appended claims, and accompanying drawing, wherein:

Fig. 1 is a vertical sectional view partly in elevation showing the complete assembly of the device, Fig. 2 is a side elevation of the connection of the frame arms to the pole socket taken at 90° to its position in Fig. 1, Fig. 3 is a sectional view of the connection of Fig. 2 taken along line 3—3 of Fig. 1, Fig. 4 is a sectional view of the device taken along line 4—4 of Fig. 1, and Fig. 5 is a sectional view similar to Fig. 3 but illustrating the adaptation of the invention to larger reels.

The embodiment of the invention illustrated herein is similar in many respects to that described and claimed in copending application Serial No. 253,568 since issued as Patent No. 2,252,777 and in my prior Patent No. 2,184,149 dated December 19, 1939. It comprises a yoke frame formed of two spaced arms 10 and 12 between which a winding drum shaft is journaled. A drum 14 for winding and unwinding the fishing line is secured to the shaft. On one side of the frame, preferably the right side, an operating handle 16 is provided for winding the drum. On the opposite side of the frame, a brake control handle 18 and a gear selector control knob 20 are located. A speed change mechanism is provided between the operating handle and the winding drum which is enclosed in a housing 22 secured to the side of the right frame arm 12. As described in my aforesaid patent and application for patent, the gear selector control operates axially through the winding drum shaft and is provided on its inner end with means for selectively controlling the drive relation between the handle and the winding drum.

The invention herein relates to the construction of the yoke frame enclosing the reel mechanism and particularly to the manner of detachably securing the frame arms 10 and 12 to the pole receiving parts of the device. As previously stated, an important object of this invention is to provide a form of attachment for the arms and the pole receiving members which allows the same arms to be used regardless of the size of the reel. This is an important consideration in the manufacture of this type of reel, especially since different sizes will be made for various kinds of deep water fishing.

As shown in the drawing, the intermediate sections of the arms 10 and 12 extend generally parallel to one another. They are shaped to clear the flanges of the drum 14. The ends of the arms are bent inwardly toward one another on diametric opposite sides of the drum, but terminate short of one another. Between each pair of spaced ends of the arms is a member shaped to receive and hold a pole or rod. Between the upper ends of the arms a member or collar 24 is provided with a longitudinal hole therethrough for receiving the end of the long fishing rod or pole 26. Between the lower ends of the arms a member or collar 28 is similarly provided with a longitudinal hole for receiving a rod 30 which serves as the butt or rest. Suitable means may be used for securing the rods against removal from the members. In the case of the fishing pole 26, it is provided with an annular flange 32 bearing on the end of the member 24 and a sleeve 34 which embraces the flange and is threadedly secured to member 24 to lock the pole from withdrawal as is clearly evident from the drawing. With respect to the butt or rest 30, it may be provided with external threads for threaded engagement with the member 28 as shown in the drawing.

The arms 10 and 12 are connected to the members in a distinctly novel fashion to adapt the arms to any size reel structure. The members or sleeves 24 and 28 are formed with relatively projecting side portions in the line of the arms 10 and 12. In the case of member 24, the side portions extend beyond the outer dimensions of the sleeve 34. To facilitate connection and adapt the arms for various sizes of reel structures, the ends of arms 10 and 12 extend not only toward one another but are provided with extensions in the directions of the rod sections having inside flat surfaces adapted to abut outward flat surfaces on the members 24 and 28. Extending through these abutting flat surfaces are fastening means in the form of bolts 36 for the upper connection and bolts 38 for the lower connection. Preferably the flat abutting faces on opposite sides of the rod sections extend parallel with one another. As a result, sectional views through the members 24 and 28 show them in rectangular formation. This is not necessarily so in all cases, but is the preferred way of shaping these members. It is economical to make and provides a rugged construction.

As shown in Fig. 3 and Fig. 4, members 24 and 28 are shaped with four flat sides providing a squared configuration. The ends of the arms lie flat against opposite sides of these members. Several bolts are used for connecting the end of each arm to the members. This improves the rigidity of the construction. In the case of member 24 which receives the fishing pole 26, the flat surface engagement of the arms with the member enables two of the bolts 36 to be disposed side by side perpendicular to the longitudinal dimension of the pole. This increases the resistance of the connection to the heavy strains imposed on the reel structure in deep sea fishing.

If a reel of a different size is used, such as a larger size, the same arms 10 and 12 may be used. To provide for the larger reel, all that is necessary is that wider collars 24 and 28 be used. Fig. 5 illustrates such a condition. The same arms 10 and 12 are used in this modification but the member or collar 24' to which the arms are connected has a larger dimension laterally than the collar 24 previously described. Similarly, the opposite ends of the arms are joined to a wider butt receiving collar. As a result the intermediate sections of the arms 10 and 12 will be spaced further apart and can accommodate a larger reel.

What I claim is:

1. In combination with a fishing reel having a winding drum and a shaft therefor, a yoke-shaped frame straddling the reel and providing journals in which the drum shaft is rotatably supported, said frame consisting of two frame members extending in spaced generally parallel relationship on opposite sides of the drum and having their opposite ends turned inwardly toward one another beyond the drum but terminating short of one another, a collar between each pair of ends of the frame members, each collar having parallel flat surfaces on opposite sides thereof, the ends of said frame members having inwardly facing flat surfaces adapted to abut the flat surfaces on the collars, and fastening means in the form of bolts adapted to extend through the abutting faces of said members and said collars to secure the yoke frame together about the winding drum, each collar having a socket opening adapted to receive a pole section, said sockets being in alignment when the collars are secured between the ends of the frame members, the socket opening of one collar being a socket recess against the bottom of which the pole section abuts, the socket opening of the other collar extending entirely therethrough.

2. In combination with a fishing gear including pole sections, a reel, handle, a pair of frame arms adapted to straddle the reel and form a journal support therefor, said arms being adapted to extend past opposite sides of the reel perpendicular to the axis of rotation thereof and of such shape that the ends of the arms extend inwardly toward one another within the plane of the reel but terminate short of one another, a sleeve between each pair of ends of the arms adapted to receive the pole sections to support the same in alignment on opposite sides of the reel, said sleeves and said ends of the arms being provided with flat confronting faces which are adapted to be brought into abutment, and bolts adapted to extend through the ends of the arms from the outside thereof and into the sleeves to secure the arms firmly to the sleeves.

3. A yoke frame assembly for fishing reels comprising, in combination, a pair of frame arms of corresponding shape adapted to be brought into spaced parallel position, the shape of said arms being such that when thus positioned their intermediate sections are relatively widely spaced apart and their end sections in close but slightly spaced apart condition, a square-shaped body between each pair of end sections of the arms, and fastening means extending through said end sections and said bodies and securing the former to the latter to form a complete yoke, said bodies being hollowed to form sockets for the reception of rod sections.

4. A yoke frame assembly for fishing reels comprising, in combination, a pair of frame arms adapted to be brought into spaced generally parallel relationship, said arms being of a shape that when thus positioned their intermediate sections are relatively wide apart for the reception of a reel therebetween and their opposite end sections are relatively close but slightly spaced apart, a body of generally square configuration between each pair of end sections, said bodies each having a hole extending longitudinally therethrough for receiving the end of a rod, said end sections having inwardly facing flat surfaces adapted to lie flat against the opposite sides of said squared bodies, and a plurality of bolts adapted to extend through each end section and the side of the body with which it is brought into contact including two bolts disposed in side by side relation perpendicular to the longitudinal dimension of the rod to be received by the body.

WALTER D. MARR.